United States Patent [19]
Gritching

[11] Patent Number: 5,352,253
[45] Date of Patent: Oct. 4, 1994

[54] POT PLANT WATERING SYSTEM

[75] Inventor: Joseph W. Gritching, Terrey Hills, Australia

[73] Assignee: Lease-A-Leaf Pty. Limited, Terrey Hills, Australia

[21] Appl. No.: 43,810

[22] Filed: Apr. 7, 1993

[30] Foreign Application Priority Data

May 22, 1992 [AU] Australia ............................ 17083/92

[51] Int. Cl.⁵ ............................................ A01G 27/00
[52] U.S. Cl. ........................................ 47/58.01; 47/81
[58] Field of Search ...................... 47/58.01, 79, 80, 81

[56] References Cited

U.S. PATENT DOCUMENTS

| | | | |
|---|---|---|---|
| 2,072,172 | 3/1937 | Lockyer | 47/81 |
| 4,989,815 | 6/1983 | English et al. | 47/81 |
| 5,181,951 | 1/1993 | Cosse | 47/81 |

FOREIGN PATENT DOCUMENTS

| | | | |
|---|---|---|---|
| 43811/64 | 4/1964 | Australia . | |
| 85076/75 | 9/1974 | Australia . | |
| 87120/75 | 11/1975 | Australia . | |
| 25119/77 | 5/1976 | Australia . | |
| 71960/81 | 6/1980 | Australia . | |
| 71964/81 | 6/1981 | Australia . | |
| 66991/90 | 11/1989 | Australia . | |
| 1064281 | 8/1959 | Fed. Rep. of Germany | 47/81 |
| 8912384 | 12/1989 | World Int. Prop. O. | 47/81 |

OTHER PUBLICATIONS

Interior Landscape Design by Nelson Hammer, ASLA pp. 152 to 155 McGraw-Hill Architectural & Scientific Publications, Inc. 11 West 19th Street, New York, N.Y. 10011.

Primary Examiner—Henry E. Raduazo
Attorney, Agent, or Firm—Fisher & Associates

[57] ABSTRACT

A sub-irrigation wick watering system is used for watering a plant growing in growing medium in a permeable container (14). The permeable container (14) is surrounded by a decorative or like container (16) holding a desired volume of water (17). The system includes a support member (13) adapted to be located on the base of the decorative or like container (16) and provide underlying support for the permeable container (14). The support member (13) is of a height, when so located, greater than the height of the water (17) in the decorative or like container (16).

Water absorbent wicks (11, 12) are adapted to be located so as to communicate between the water (17) in the decorative or like container (16) and the growing medium in the permeable container (14) by passing through holes (15) in the permeable container (14). When the support member (13) and the water absorbent wicks (11, 12) are so located, water from the decorative or like container (16) is absorbed by and passes by capillary attraction along the wicks (11, 12) to the growing medium in the permeable container (14).

4 Claims, 1 Drawing Sheet

POT PLANT WATERING SYSTEM

FIELD OF THE INVENTION

The present invention relates to pot plant watering systems and, in particular, to a sub-irrigation wick watering system for pot plants.

BACKGROUND OF THE INVENTION

The sub-irrigation of plants growing in pots has received much attention in recent times as an inexpensive, non-labour intensive form of indoor plant maintenance.

Furthermore, the sub-irrigation of plants ensures that people unskilled in plant maintenance will not over water or under water the plants when watering from the top of the soil surface.

Most approaches to date have involved the removal of the plant with its surrounding intact soil structure from its growing pot and its transplantation into an impermeable decorative container that is adapted to house a sub-irrigation structure.

In one known method of this type, the decorative container has a tank located at its bottom and the plant with its soil structure is placed on top of the tank and backfilled with peat moss. The tank serves as a reservoir of water for the growing plant and has a filler tube through which water is fed into the tank and a structure referred to as a 'capillary cone' which allows water from the tank to pass upwardly into the soil surrounding the roots of the plant. This system is, however, very expensive and is time consuming to install.

In another method, the decorative container has a water filled tank located at its bottom and a wick lying on the bottom of the growing pot with its ends passing into the tank through holes so that the wick ends are suspended in the water. Once again, the plant with its soil structure is knocked out of its growing pot and placed in the decorative container on top of the wick. Water passes along the wick by capillary attraction from within the tank and encounters the soil structure at its base.

Both the above mentioned methods require that the plant be removed from its growing pot into a decorative container. If the soil surrounding the roots of the plant does not remain intact during this transplantation, such as may occur with coarse soil or if an unskilled person haphazardly knocks the plant out from its growing pot, the future growth of the plant in the decorative container may be jeopardized.

Furthermore, the means for passing water to the soil in both methods only brings the water to the base of the soil structure and so the water still needs to be attracted up to near the roots of the plant before it can be absorbed.

BRIEF SUMMARY OF THE INVENTION

It is an object of the present invention to overcome or substantially ameliorate the disadvantages of the prior art.

According to the invention there is provided a method of sub-irrigation watering a plant growing in a growing medium in a growing pot, the said growing pot being surrounded by a decorative or like container holding a desired volume of water, the method comprising:

(i) laying at least one water adsorbent wick on a surface, (ii) laying a support member on top of the at least one wick so that the at least one wick has at least one freely exposed end that extends outwardly of the support member, (iii) placing the growing pot on top of the support member so that the at least one freely exposed end extends outwardly of the growing pot, (iv) urging the at least one freely exposed end separately through a corresponding number of holes in the growing pot so that the so located end or ends penetrate into the growing medium, thereby forming a wick watering structure, (v) placing the said wick watering structure into a decorative or like container, and (vi) adding a desired volume of water to the decorative or like container so that the water level does not rise above the height of the support member, and so that water is absorbed by and passes by capillary attraction along the at least one wick to the growing medium in the growing pot.

Preferably, the number of water absorbent wicks is two and they are laid in step (i) so that they overlap to form a cruciform structure.

It is also preferred that the growing pot has four holes and that a separate wick end be urged through each hole and penetrate into the growing medium in such a way as to tightly grip the support member against the bottom of the growing pot.

BRIEF DESCRIPTION OF THE DRAWINGS

In order that the invention may be more readily understood and put into practical effect, reference will now be made to the accompanying drawings, in which.

DETAILED DESCRIPTION OF THE INVENTION

Figure 1:
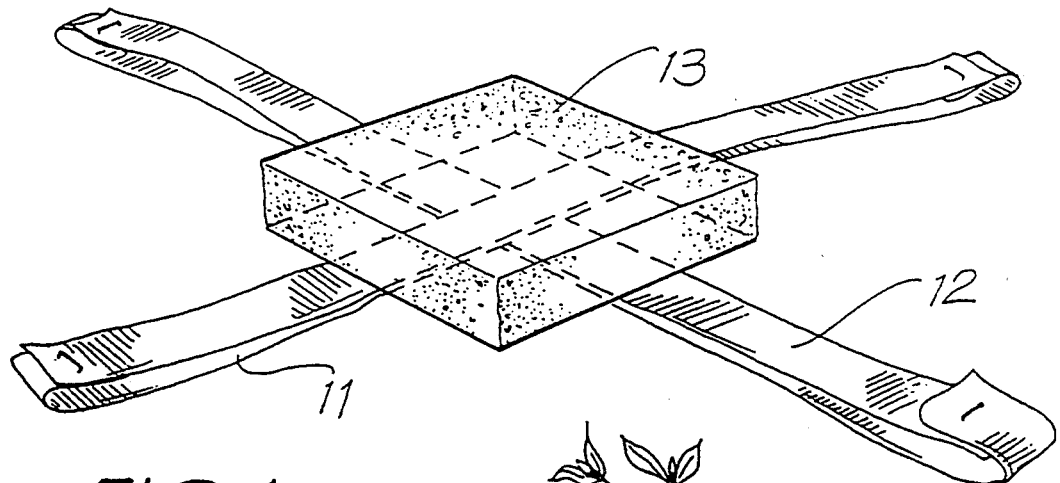
FIG. 1 is a perspective view of two overlapping water absorbent wicks overlaid by a support member.
Figure 3:
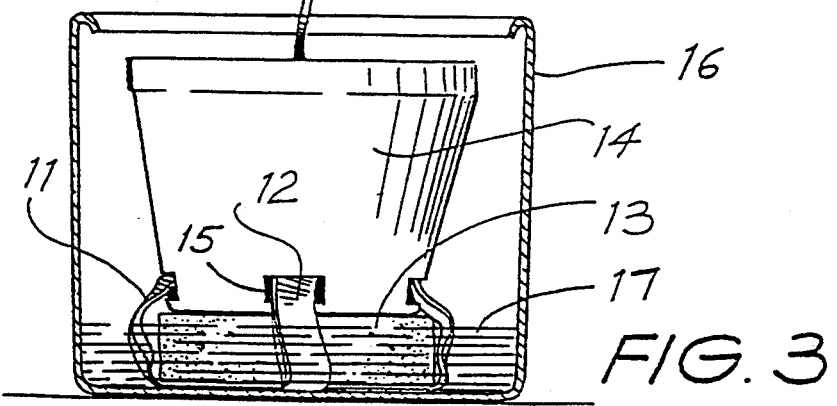
FIG. 3 is a side view of a plant containing growing pot into which the ends of the wicks have been urged, the growing pot being located in a decorative container containing a desired volume of water.

The first steps of assembling the sub-irrigation wick watering system shown in FIG. 3 is shown in FIG. 1. Two water absorbent wicks 11 and 12 are laid on a flat surface so that they overlap at or near their mid points to form a cruciform structure. Each of the wicks 11 and 12 are folded over and have their ends stapled or otherwise connected together so that they form a continuous loop. A staple may also be used to connect the overlapped portions of the wicks 11 and 12.

The wicks 11 and 12 are preferably a polyester tape about 25 mm wide, but any fabric having water absorbent and capillary attraction properties may be used. The number and size of wicks may vary to suit the size of the growing pot, the type of growing medium and the plant's growth requirements.

A polystyrene block support member 13 is then laid on top of the overlapping portion of the wicks 11 and 12. The support member may alternatively be a polystyrene ring. The wicks 11 and 12 may be fixedly connected to the support member. The block support member 13 has an upper surface area large enough to be able to support the growing pot and has a height or depth just greater than the maximum depth of water present in the decorative container.

Figure 2:
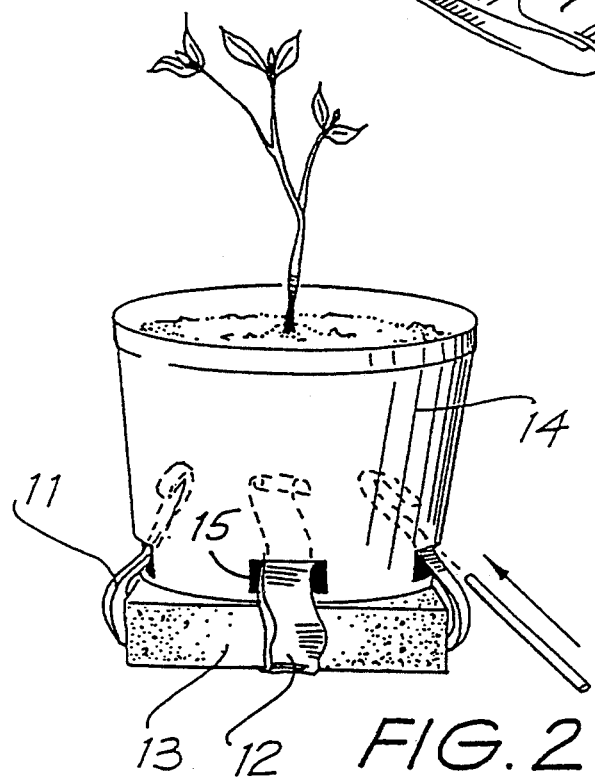
FIG. 2 is a perspective view of a plant containing growing pot into which the ends of the wicks are being urged.

The growing pot 14, which is the pot in which the plant grows, is then placed on top of the block support member 13 as shown in FIG. 2. The growing pot 14 has four permeation holes 15 arranged evenly around its lower side circumference. Permeation holes are a normal feature of pots for growing plants. The pot 14 is located such that each of the permeation holes 15 is adjacent to one of the four spikes or ends of the wick cruciform structure.

Each wick spike or end is then urged through its respective adjacent permeation hole 15 into the growth medium or soil by use of a suitable rod (as shown in FIG. 2) until each wick is in a tensioned state and the effect of all the wicks is to tightly grip the support member 13 against the bottom of the pot 14.

After this operation, the growing pot 14 with gripped support member 13 is placed into a decorative container 16. As shown in FIG. 3, water 17 is added to the decorative container 16 so that the water level does not rise above the height of the block support member 13. The water 17 is absorbed by the wicks 11 and 12 and passes along each of the four spikes by capillary attraction to the soil in the growing pot 14.

The rate at which water is drawn up to the soil is determined by the growth requirement of the plant. Because the water is introduced into the soil by capillary attraction only, the air filled spaces or pores in the soil are not flooded and hence the roots of the plant are not starved of oxygen.

Various modifications may be made in details of design, construction and method steps without departing from the scope or ambit of the invention.

I claim:

1. A method of sub-irrigation watering of a plant growing in a growing medium in a growing pot, said growing pot being surrounded by an impermeable container holding a desired volume of water, said method comprising the steps of:
   (i) providing a pair of wicks and crossing said wicks so that said wicks overlap in the shape of a cruciform structure;
   (ii) laying a support member on top of said overlapping wicks so that said wicks have freely exposed ends that extend outwardly from said support member;
   (iii) placing said growing pot, having holes therein, on top of said support member so that said freely exposed ends extend outwardly from said growing pot;
   (iv) urging said freely exposed ends separately through corresponding holes in said growing pot so that said ends penetrate into said growing medium, thereby forming a wick watering structure;
   (v) placing said wick watering structure into a water impermeable container; and
   (vi) adding a desired volume of water to said impermeable container so that the water level is at least the height of said wicks, and so that said water is absorbed by and passes by capillary attraction along said wicks to said growing medium in said growing pot.

2. The method recited in claim 1, wherein said holes are permeation holes and each of said wick ends are urged through a separate permeation hole and penetrates into said growing medium in such a way as to tightly grip said support member against a bottom of said growing pot.

3. The method recited in claim 1, wherein each one of the pair of said wicks is folded over and has respective ends connected together so that each one of said pair of wicks form a continuous loop.

4. The method of claim 1, wherein said freely exposed ends of said wicks are urged through the said holes by forcing with a rod.

* * * * *